(12) United States Patent
Dingwall et al.

(10) Patent No.: US 7,862,277 B2
(45) Date of Patent: Jan. 4, 2011

(54) COMPONENT INTERLOCKING

(76) Inventors: David Dingwall, Lot 111 Candowie Crescent, Karara Downs (AU) QLD 4306; Wayne Brinkley, 2-6 Natalie Road, Buccan (AU) QLD 4206; Bruce Gale, 19 Suffolk Street, Paddington (AU) NSW 2021

( * ) Notice: Subject to any disclaimer, the term of this patent is extended or adjusted under 35 U.S.C. 154(b) by 0 days.

(21) Appl. No.: 10/528,469

(22) PCT Filed: Sep. 23, 2003

(86) PCT No.: PCT/AU03/01284

§ 371 (c)(1),
(2), (4) Date: Mar. 21, 2005

(87) PCT Pub. No.: WO2004/029371

PCT Pub. Date: Apr. 8, 2004

(65) Prior Publication Data

US 2006/0078373 A1  Apr. 13, 2006

(30) Foreign Application Priority Data

Sep. 30, 2002  (AU) .............................. 2002951728

(51) Int. Cl.
*F16B 21/00* (2006.01)
*E02F 9/28* (2006.01)
*A01B 15/00* (2006.01)

(52) U.S. Cl. ...................... 411/351; 411/941.1; 37/452; 37/457; 37/450; 37/456; 172/753

(58) Field of Classification Search ................. 411/351, 411/941.1; 37/452, 457, 450; 172/753
See application file for complete search history.

(56) References Cited

U.S. PATENT DOCUMENTS

| 2,064,059 A | | 12/1936 | Fellmeth | |
|---|---|---|---|---|
| 2,635,366 A | | 4/1953 | Hostetter | |
| 5,068,986 A | | 12/1991 | Jones | |
| 5,205,057 A | * | 4/1993 | Garman | 37/458 |
| 5,233,770 A | | 8/1993 | Robinson | |
| 5,386,653 A | * | 2/1995 | Cornelius | 37/454 |

(Continued)

FOREIGN PATENT DOCUMENTS

AU  199853866 A1  9/1999

(Continued)

OTHER PUBLICATIONS

Sup. EU Srch Rpt (4pgs) 03798005.

*Primary Examiner*—David Reese

(57) ABSTRACT

There is disclosed a pair of components which, in the embodiment described, are a tooth (2) and adaptor (3) for earth-moving apparatus (1). The adaptor is for mounting the tooth on an earth-moving bucket, this mounting being releasable to allow replacement of the tooth when worn. The components define aligned passages (11) through which a locking pin (12) extends to retain the components together. The locking pin has formations (22) for engaging formations (20) on the first component when the pin is rotated from a free position into a locked position. The pin has an insertion recess (27) which is aligned with the formations (20) allowing the pin, in the free position, to be inserted into, or removed from, the aligned passages. The formations (20) are resiliently movable to stably engage the pin when in the locked position.

13 Claims, 6 Drawing Sheets

U.S. PATENT DOCUMENTS

| | | | |
|---|---|---|---|
| 5,435,084 A | 7/1995 | Immel | |
| 5,765,301 A * | 6/1998 | Clendenning | 37/457 |
| 5,909,962 A | 6/1999 | Livesay | |
| 5,964,547 A * | 10/1999 | Brinkley | 403/374.3 |
| 5,983,534 A * | 11/1999 | Robinson et al. | 37/459 |
| 6,108,950 A * | 8/2000 | Ruvang et al. | 37/452 |
| 6,708,431 B2 * | 3/2004 | Robinson et al. | 37/456 |
| 6,757,995 B2 * | 7/2004 | Pippins | 37/468 |
| 6,826,855 B2 * | 12/2004 | Ruvang | 37/450 |
| 6,986,216 B2 * | 1/2006 | Emrich et al. | 37/450 |
| 7,069,676 B2 * | 7/2006 | Robinson et al. | 37/457 |
| 2002/0000053 A1 | 1/2002 | Adamic et al. | |
| 2002/0023375 A1 * | 2/2002 | Pippins | 37/457 |

FOREIGN PATENT DOCUMENTS

| | | |
|---|---|---|
| AU | 773435 | 5/2004 |
| WO | WO99/23316 | 5/1999 |

* cited by examiner

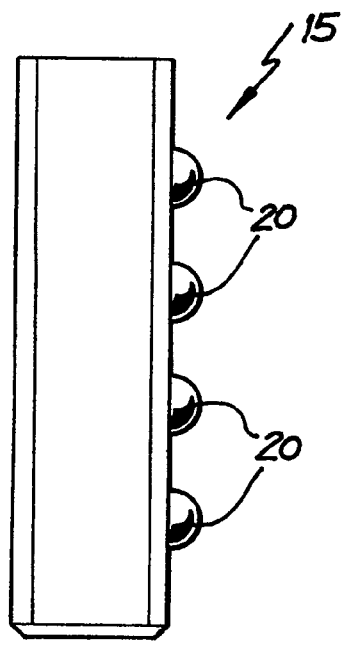 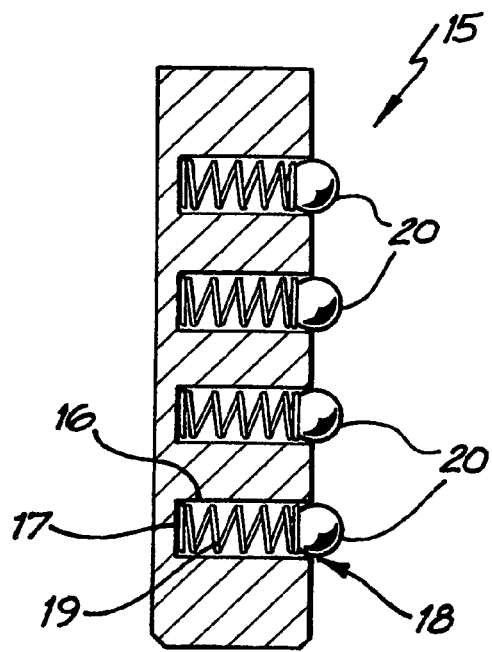
FIG. 8　　　　　FIG. 9
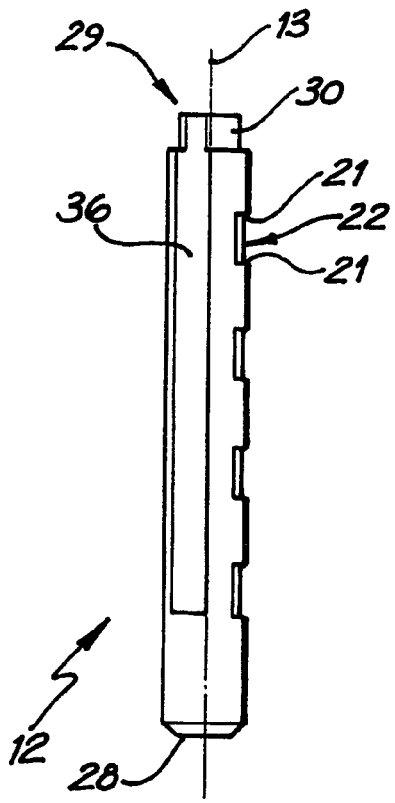 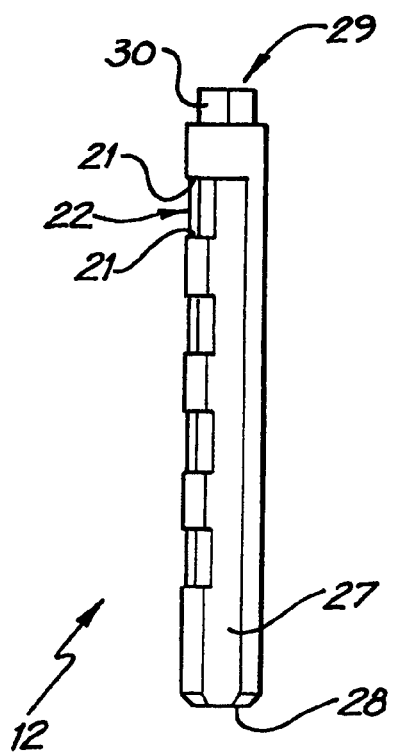
FIG. 10　　　　FIG. 11

COMPONENT INTERLOCKING

This application is a national phase application based on International Application No. PCT/AU2003/001284, filed Sep. 23, 2003, which claims priority to Australian Application No. 2002951728, filed Sep. 30, 2002, the contents of each of which are incorporated herein by reference in their entirety for all purposes.

FIELD OF THE INVENTION

This invention relates to apparatus that includes two connected and interlocked components, and to a method of interlocking the components. Such interlocking may relate to a broad range of mechanical locking systems. By way of example, it may apply to the retention of ground engaging tools such as ripper teeth, or lip shrouds and wing shrouds, or rigging components for drag lines, such as shackle pins, clevis pins, or trunnion links. In one specific embodiment, the invention relates to material moving apparatus, particularly of the earth-moving type used in mining operations.

BACKGROUND TO THE INVENTION

A known type of apparatus corresponding to the above is in the form of earth-moving equipment which includes an earth-moving bucket which is driven by a prime-mover, and a number of components (such as earth-moving teeth or such as lip shrouds or other forms of replaceable wear protection means) each of which is mounted on a leading lip of the bucket by means of a further component in the form of a respective adaptor, the adaptor being fixed to the bucket. Where, for example, such components are constituted by earth moving teeth, the teeth are the components most subject to wear, and therefore it is desirable that provision be made for easy tooth replacement. The ease of tooth replacement, in turn, depends on the manner in which the teeth are attached to their respective adaptors.

A known manner of attaching such a tooth to its respective adaptor is by means of a locking pin which is inserted into aligned holes defined by the tooth and the adaptor, to prevent these from being separated from each other. Such a locking pin is usually held in place by means of friction or other forms of interference fits. Such a pin is required to be forced into place, and removed, usually by the use of a hammer or similar tool that operates primarily on an impact basis. A disadvantage of such locking pins is the inherent risk of injury, and damage to components, due to the use of such tools. For example, the hammering might result in metal fragments breaking off the pin, and these could cause injury. In addition, the hammering action may involve muscle injury.

It is an object of the present invention to overcome or substantially ameliorate at least one of the disadvantages of the prior art, or to provide a useful alternative.

SUMMARY OF THE INVENTION

According to a first aspect of the invention there is provided apparatus including:
   a first component defining a first passage;
   a second component connectable with the first component and defining a second passage, said passages being aligned when the components are connected to each other;
   a locking pin configured for being accommodated in the aligned passages thereby to prevent separation of the components, the pin being rotatable, when so accommodated, relative to the components, between
      a locked position in which the pin engages at least one of the components to prevent withdrawal of the pin from the aligned passages, and
      a free position in which the pin is slidably removable from the aligned passages to permit separation of the components.

In a preferred embodiment, the apparatus is configured such that when the first component and second component are connected to each other, they can substantially only be separated by effecting relative movement of the components in opposite disengagement directions, and such that the extending of the pin from the first passage into the second passage prevents said relative movement in said disengagement directions. Preferably, the apparatus is configured such that the pin, when accommodated in said aligned passages, extends in a direction non-parallel to said disengagement directions. Then, preferably, the apparatus is configured such that the pin, when accommodated in said aligned passages, extends in a direction substantially perpendicular to said disengagement directions.

Preferably, one of said components includes a first formation, and the pin has a second formation configured for engagement with the first formation when the pin is in the locked position. In a preferred embodiment, the pin is of generally cylindrical shape and the second formation includes a pair of spaced walls at least partly defining a circumferentially extending slot in the pin, the pin being configured such that the first formation enters the slot as the pin is rotated from the free position to the locked position.

Preferably, the pin has an axis of rotation about which the pin rotates between the free and locked positions, the pin further having a surface which constitutes a floor of the slot, the floor having a first end, with successive positions along the floor away from the first end being disposed successively further, radially, from said axis, the first formation being configured to engage and ride along said floor when the pin is rotated from the free position to the locked position. The floor preferably has a second end opposite the first end thereof, and preferably defines a substantially flat or concave land area adjacent the second end for stably engaging the first formation when the pin is in the locked position.

In a preferred embodiment, the slot extends helically about the pin such that upon rotation of the pin from the free position to the locked position, the first formation engages at least one of said walls to draw the pin further into said aligned passages, and upon rotation of the pin from the locked position to the free position the first formation engages at least one of said walls to force the pin partly out of said aligned passages.

The pin preferably has therein an insertion recess extending, longitudinally relative to the pin, to at least a first end of the pin, the insertion recess being configured to accommodate the first formation to permit insertion of the pin into said aligned passages when the insertion recess is aligned with said first formation.

In this case, in a preferred embodiment, the insertion recess extends to the first end of the pin but terminates at a position spaced from an opposite, second end of the pin, the pin preferably further having therein a withdrawal recess which is spaced, circumferentially relative to the pin, from the insertion recess, and which extends longitudinally relative to the pin to said second end of the pin but which terminates at a position spaced from said first end of the pin, whereby the insertion recess permits insertion of the pin via one end of said aligned passages in a first longitudinal direction of the pin when the insertion recess is aligned with the first formation, and the withdrawal recess permits withdrawal of the pin in said first direction, via an opposite end of said aligned passages, when the withdrawal recess is aligned with the first formation. In one preferred embodiment, the pin is configured such that, once having been inserted into the aligned passages with the insertion recess aligned with the first formation, the pin is in the free position and is rotatable to the locked position in a particular rotational direction, and once having being rotated thus to the locked position, is rotatable in said particular rotational direction to a further position in which the withdrawal recess is aligned with the first formation.

In a preferred embodiment, the passage of one of the components is closed at one end such that said aligned passages are closed at one end. The component having a passage closed at one end preferably includes a resilient element in that passage immediately adjacent the one closed end, wherein the pin, when accommodated in said aligned passages, is configured to abut against the resilient element.

Preferably, the passage of one of said components includes two coaxial spaced-apart sub-passages, and the passage of the other component is disposed between, and aligned with, said sub-passages when the components are connected to each other, to form said aligned passages.

In a preferred embodiment, at least part of said first formation is resiliently movable under a force exerted by the pin when the pin is rotated from said free position to said locked position. Then, preferably, the particular said component that includes said first formation further includes resilient means for allowing said resilient movement of said part of the first formation, while urging said part against the pin.

In a preferred embodiment, said particular component includes a retaining element which, in turn, includes an elastomeric support and an engagement element, wherein the support constitutes said resilient means and the engagement element includes said first formation and abuts the support. Then, in one preferred embodiment, the support defines a channel in which the engagement element is received. The support and engagement element are then preferably bonded to each other. The support preferably defines a deformation passage extending substantially parallel to said channel, to facilitate resilient deformation of the support.

In a preferred embodiment, the pin includes a plurality of second formations and the engagement element is castellated so as to define a plurality of first formations, each for engaging with a respective second formation when the pin is in the locked position.

In another preferred embodiment, said particular component includes a retaining element which defines a hole having a closed end and an opposite open end, the retaining element including said resilient means within said hole and including said first formation, the first formation being movable along said hole and abutted against said resilient means, and protruding through said open end. In this embodiment, the first formation is preferably constituted by a ball, and the resilient means is preferably constituted by a coil spring or an elastomeric material such as rubber.

Preferably according to this other embodiment, the retaining element includes a plurality of said holes and said first formations and the pin includes a plurality of corresponding second formations.

In a preferred embodiment, the first and second components are machinery components, the first component being a wear-component configured to wear in use, and the second component is configured to support the first component.

In a preferred embodiment, the first component and second component are components of earth moving equipment. Then, in a preferred embodiment, the first component and second component are a tooth and adaptor, respectively, or a shroud and adaptor, respectively, of earth moving equipment, the adaptor being configured to mount the tooth or shroud, as the case may be, to an earth moving bucket. In another embodiment, the first component is a tooth or shroud, and the second component is a lip, of an earth moving bucket The pin preferably includes a non-circular formation at an end of the pin for engagement with a rotatable tool to effect rotation of the pin between the free and locked positions.

Preferably, the pin, adjacent, but spaced from, one end, has a cavity therein, and an end portion extending from said one end to the cavity, the end portion having an aperture extending therethrough and opening through said one end and opening into the cavity, the end portion having an inner surface facing into the cavity away from said one end, the aperture permitting the insertion of a pin-removal tool therethrough into the cavity and withdrawal of the pin from said aligned passages by engagement of the pin-removal tool with said inner surface. The apparatus preferably includes a cap releasably engageable with the pin at said one end.

According to a second aspect of the invention there is provided a method of releasably interlocking a first component and a second component, wherein the first component defines a first passage and the second component defines a second passage, the method including the steps of:
    connecting the first component to the second component so that the first and second passages are aligned with each other;
    inserting a pin into the aligned passages so that, when so inserted, the pin is in a free position in which it is free to be selectively withdrawn from the aligned passages;
    rotating the pin relative to the components, from the free position to a locked position in which the pin engages at least one of the components to prevent withdrawal of the pin from the aligned passages and hence to prevent separation of the components.

BRIEF DESCRIPTION OF THE DRAWINGS

Preferred embodiments of the invention will now be described, by way of example only, with reference to the accompanying drawings in which:

FIG. 8 is a schematic side elevation of a retaining element in accordance with another embodiment of the invention;

FIG. 9 is a schematic side section view through the retaining element of FIG. 8;

FIGS. 10 and 11 are schematic side elevations, shown from different sides, of a locking pin according to a different embodiment of the invention to that shown in FIGS. 4 and 5;

DETAILED DESCRIPTION

Figure 1:
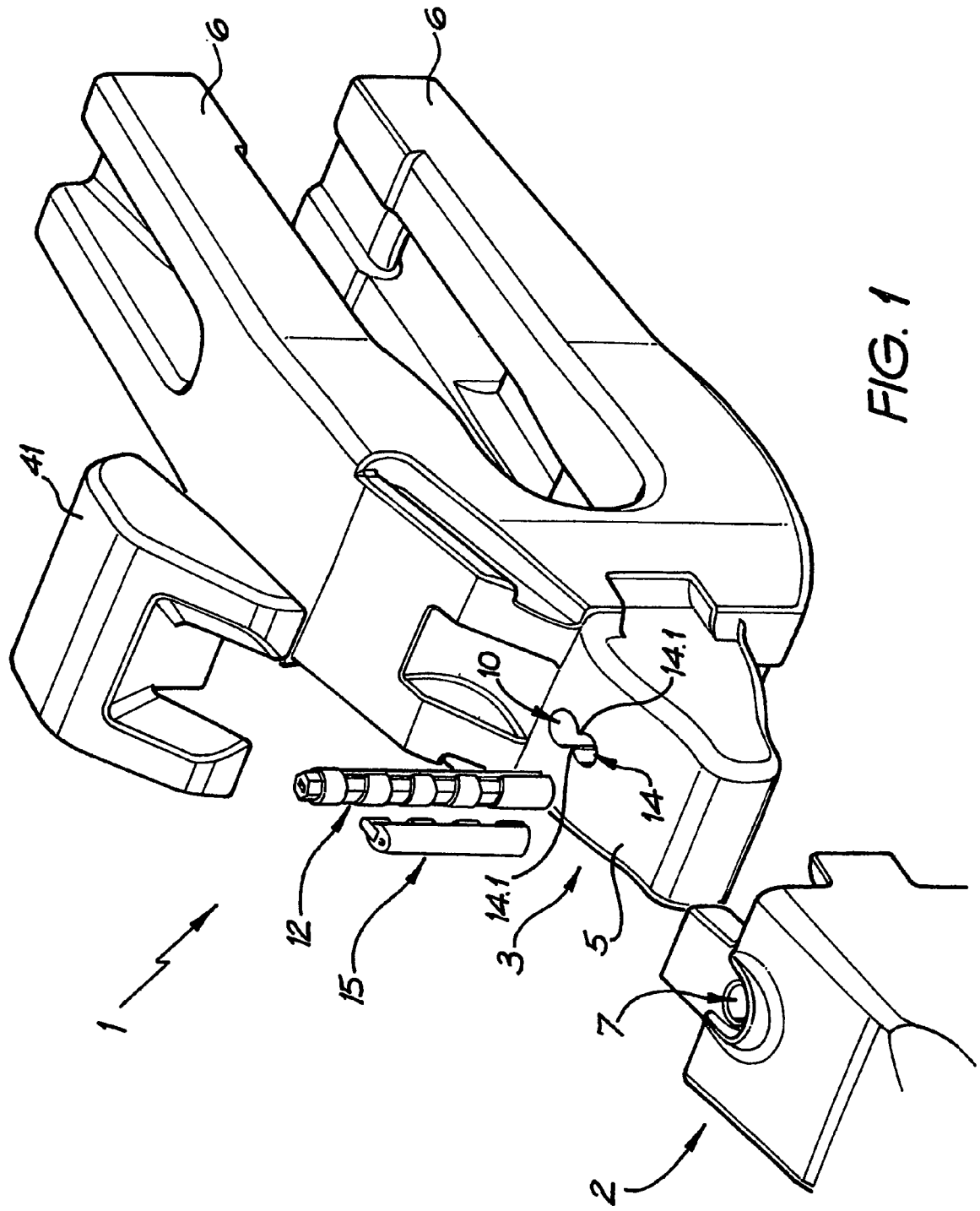
FIG. 1 is a partial schematic, exploded perspective view of material-moving apparatus in accordance with an embodiment of the invention.
Figure 2:
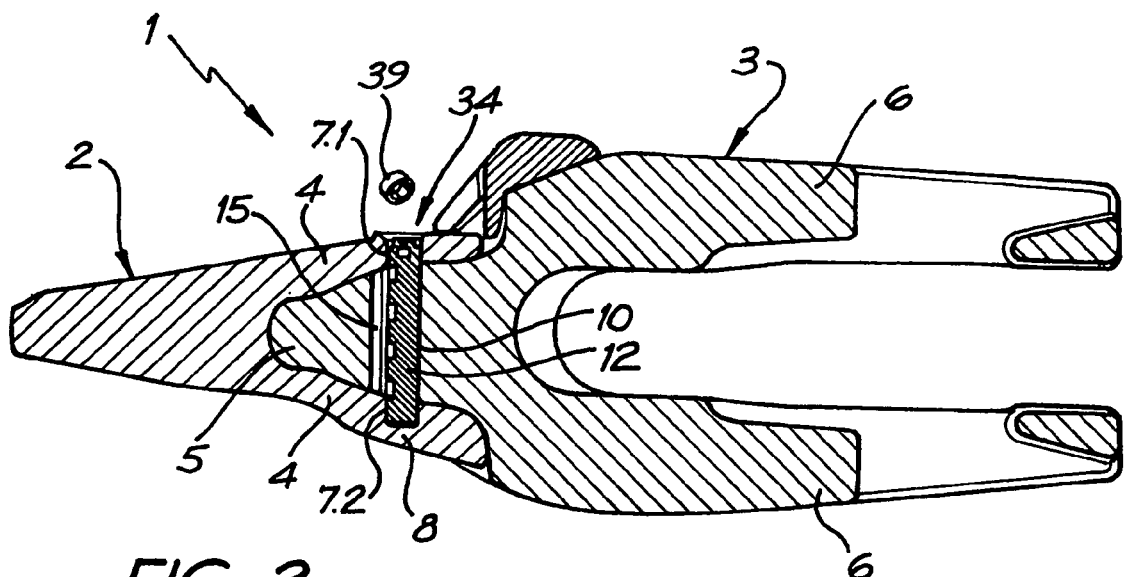
FIG. 2 is a schematic side elevation, shown partly cut away, of part of the apparatus of FIG. 1.
Figure 3:
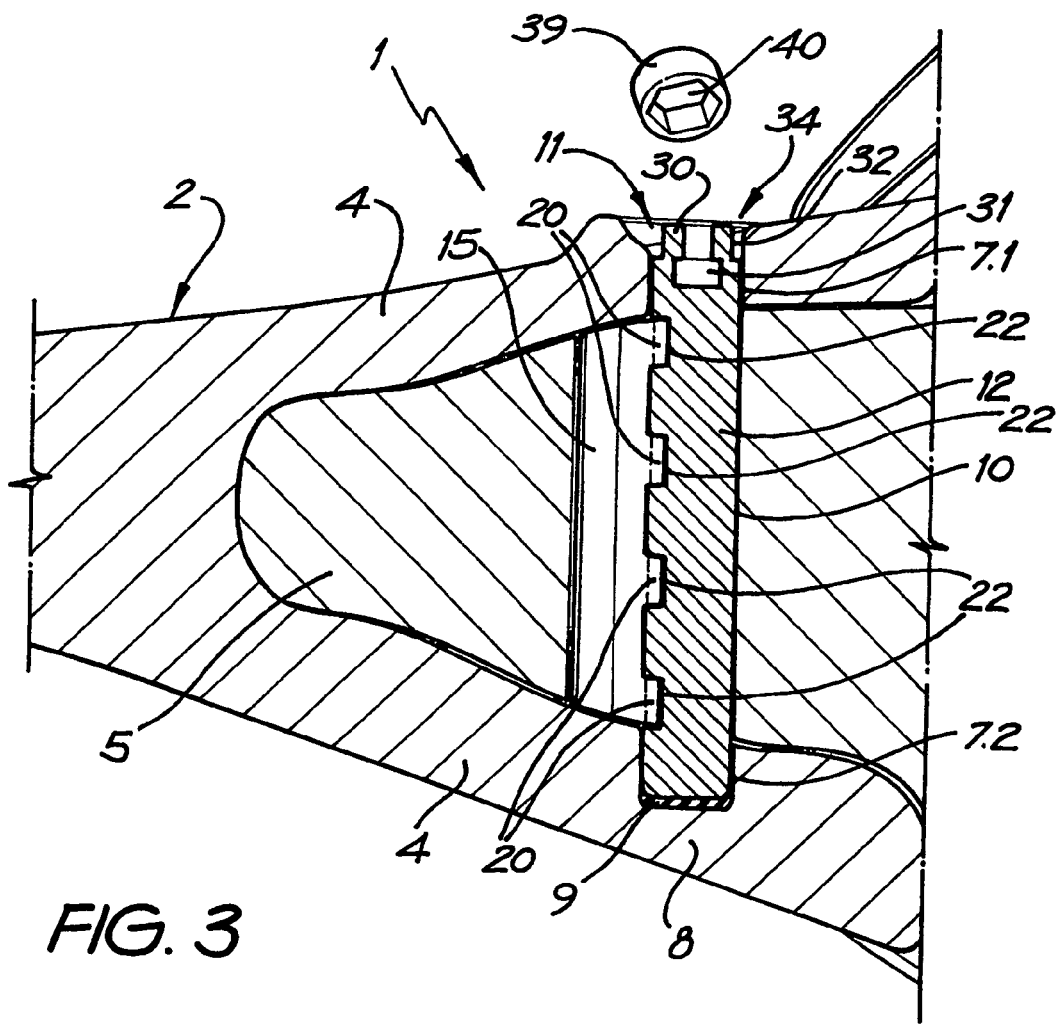
FIG. 3 is a schematic side elevation, shown partly cut away, of detail of the apparatus as shown in FIG. 2.

Referring to the FIGS. 1 to 3, there is shown a material-moving apparatus 1 which, more specifically, is of the type used for earth-moving operations in the mining industry. The apparatus 1 includes a component in the form of a tooth 2 and a further component in the form of an adaptor 3. The tooth 2 has a pair of spaced protrusions 4 and the adaptor 3 has a formation 5 which is generally complementarily shaped relative to the space defined between the protrusions 4. The adaptor 3 also has a pair of protrusions 6 defining a space between them.

The adaptor 3 is connectable to the tooth 2 by way of accommodating the formation 5 in the space between the protrusions 4, and is attached to a leading lip of an earth-moving bucket of a prime mover, which lip is received in the space between the protrusions 6 (the bucket and prime mover not being shown). The adaptor 3 is thus used for mounting the tooth 2 to the bucket. Generally, a number of such tooth-and-adaptor combinations will be mounted, spaced from one another, to such a bucket in use.

The tooth 2 defines a passage generally designated 7, which consists of two aligned sub-passages 7.1 and 7.2, one in each of the protrusions 4. One of the sub-passages, 7.2, has a closure 8 at an outer end, with a resilient element 9 (see FIG. 3) immediately adjacent the closure. In an alternative embodiment (not shown), the element 9 may be omitted. The adaptor 3 also defines a passage 10, in the formation 5, which is aligned with the sub-passages 7.1 and 7.2 when the tooth 2 and adaptor are connected to each other, as shown in FIGS. 2, 3 and 12 to 14. These passages 7.1, 7.2 and 10, when so aligned, are referred to below for convenience as the "aligned passages", generally designated 11.

A generally cylindrical locking pin 12 is accommodated in the aligned passages 11 for preventing the tooth 2 and adaptor 3 from being pulled apart in opposite directions transverse to the pin, and thus from being separated from each other. When so accommodated, the pin 12 is rotatable, about an axis 13 (see FIG. 4), relative to the tooth 2 and adaptor 3, between a locked position and a free position, as will be described in more detail below.

The adaptor 3 defines a further passage 14 (see especially FIG. 1) which is immediately adjacent to, and which opens along one side into, the passage 10. The adaptor 3 includes a retaining element, generally designated 15 (see FIGS. 6 to 9), which is accommodated within the passage 14.

Figure 6:
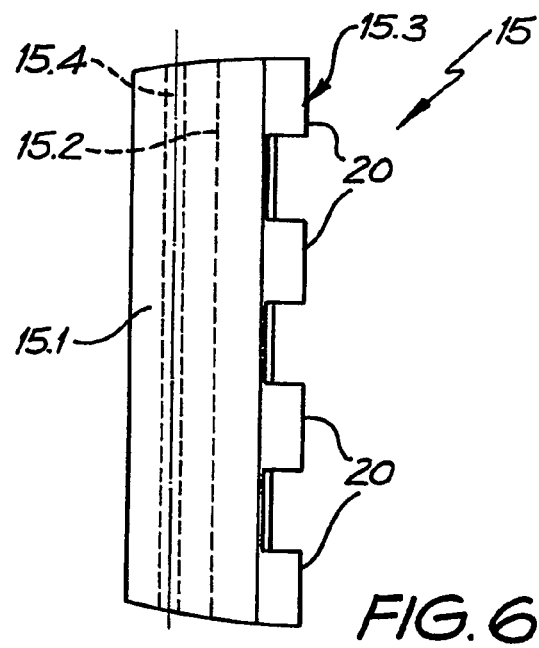
FIG. 6 is a schematic side elevation of a retaining element in accordance with an embodiment of the invention.
Figure 7:
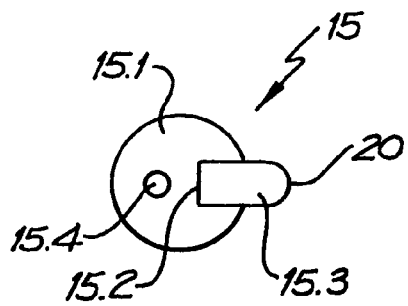
FIG. 7 is a schematic plan view of the retaining element of FIG. 6.

In one preferred embodiment (see FIGS. 6 and 7), the retaining element 15 includes a resilient support 15.1 of an elastomeric material such as rubber. The support 15.1 defines a longitudinally extending channel 15.2 in which is located an engagement element 15.3. As can be seen in FIG. 6, the engagement element 15.3 is castellated so as to define a series of formations, generally designated 20, in the form of engagement teeth, and these protrude into the passage 10 of the adaptor 3 (see FIGS. 2 and 3). The support 15.1 may be moulded together with the engagement element 15.3 so that they are effectively bonded together. One or more transverse passages (not shown) may be provided in the engagement element 15.3 such that when so moulded, the elastomeric material of the support 15.1 sets in the passages, effectively to key the support to the engagement element. The support 15.1 also defines a passage 15.4 which extends therethrough, substantially parallel to the channel 15.2, to facilitate deformation of the support when load is applied to the engagement element 15.3 as described further, below. Also as will be described in more detail below, each formation 20 is configured for engaging the pin 12.

In another embodiment (see FIGS. 8 and 9), the retaining element 15 defines a number of holes 16 each having a closed end 17 and an opposite open end 18. The retaining element 15 also has a resilient element 19 in the form of a coil spring (or, in another embodiment, in the form of an element of suitable elastomeric material such as rubber) disposed within each hole 16 as well as a formation 20 which, in this embodiment, is in the form of a ball. Each ball formation 20 is abutted against the resilient element 19 and protrudes through the open end 18 of the respective hole 16, into the passage 10 of the adaptor 3.

In another embodiment (not shown) of the apparatus 1, the relative positioning of the passage 10 and the passage 14 is reversed (i.e. rotated through 180 degrees) relative to what is shown in FIG. 1. Thus the passage 10 is disposed closer to the tooth 2 and the passage 14 further from the tooth. The advantage of this reversed relative positioning is that, if any load is applied, in use, to the tooth 2 in a direction which tends to pull the tooth from the adaptor 3, this load is transferred by the pin 12 to that material of the adaptor which forms the part of the wall of the passage 10 closest to the tip of the tooth. By contrast, in the configuration as shown in FIG. 1, such a load would be borne by the material of the adaptor which forms the inward projections 14.1 (see FIG. 1), between the two passages 10 and 14.

Figure 4:
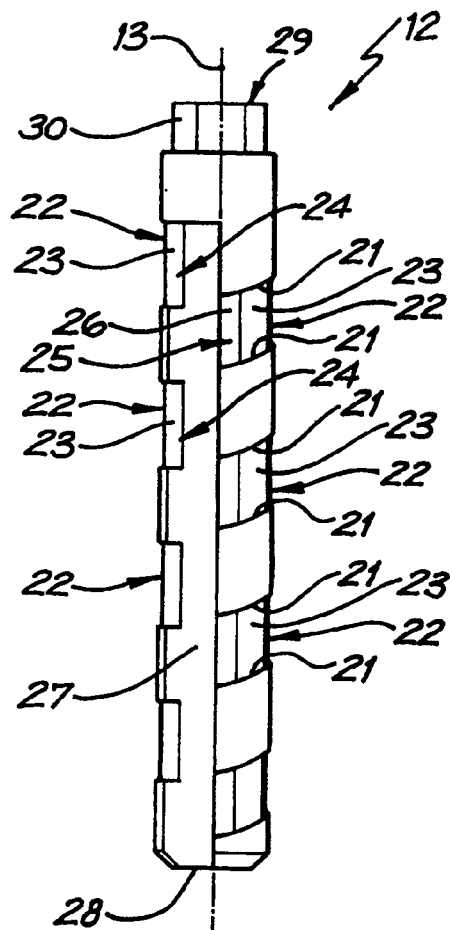
FIGS. 4 and 5 are schematic side elevations, shown from different sides, of a locking pin according to an embodiment of the invention, FIG. 5 being partly cut away.
Figure 5:
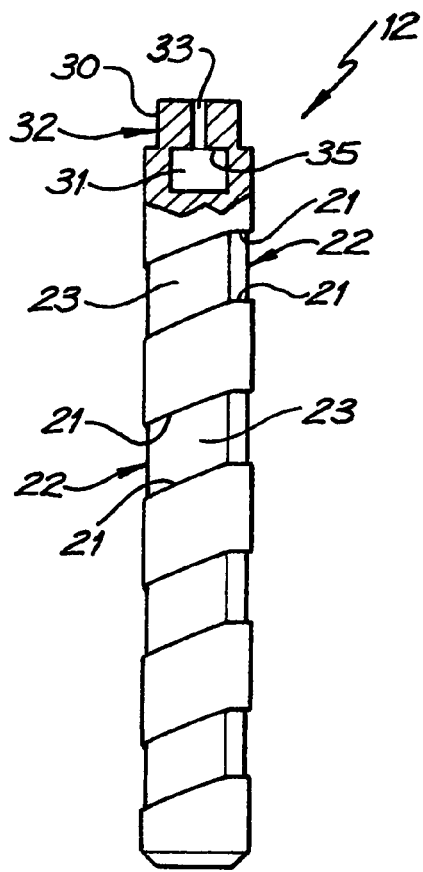

Referring to FIGS. 4 and 5, there is shown one embodiment of the pin 12. In this embodiment, the pin 12 has a number of pairs of spaced walls 21, each pair defining a slot 22 which extends circumferentially and helically relative to the pin. Each slot 22 has a floor 23 having a first end 24. Each floor 23 is spaced a certain radial distance from the axis 13 at the first end 24, and is spaced successively further, radially, from the axis, at successive positions along the floor away from the first end. Thus the floors 23 are effectively radially outwardly sloped, in a direction away from the first ends 24. Adjacent a second end 25 of each floor 23, the floor levels out into a land area 26, which, in different embodiments is flat or concave. As will be described in more detail below, the walls 21 and floors 23, and hence the slots 22 that they define, constitute formations for engaging the relevant formations 20.

The pin 12 also defines a recess 27, referred to below as an insertion recess, which extends, longitudinally relative to the pin, to one end 28 of the pin.

The pin 12 also has, at an opposite end 29, a non-circular formation in the form of a hexagonal nut 30 which forms an integral part of the pin. Below the nut 30 there is a cavity 31 within the pin 12 (see FIG. 5). Part of the cavity 31 is defined by the material of the pin 12 within the bounds of the nut 30, this portion of the pin being referred to as an end portion 32. The end portion 32 has a slotted aperture 33 therein.

In use, the tooth 2 and adaptor 3 are connected to each other as mentioned above, by receiving the formation 5 within the space defined between the protrusions 4, such that the passage 10 and sub-passages 7.1 and 7.2 are aligned with each other to form the aligned passages 11. As the tooth 2 is heavy, it may be provided with a lifting lug (not shown) so that the tooth can be moved into place relative to the adaptor 3 using a suitable sling or safety hook, which may in turn be operated via lifting equipment. The retaining element 15 is then inserted into the passage 14. The retaining element 15 is shaped so that it cannot be inserted into the passage 14 unless correctly orientated. The pin 12 is then inserted in the aligned passages 11 by first aligning the insertion recess 27 with the formations 20 that protrude into the passage 10, and then sliding the pin into place via the open end 34 of the aligned passages. The insertion recess 27 is adapted to accommodate the formations 20 to allow the pin 12 to be slid into the aligned passages 11 unimpeded by these formations.

A suitable tool such as a spanner (not shown) is then used on the 30 nut to rotate the pin 12 about the axis 13. As the pin 12 rotates, the formations 20 engage the floors 23 and the walls 21 of the slots 22. The helical orientation of the slots 22 results in the formations 20 effectively drawing the pin 12 further into the aligned passages 11, almost in the manner of a screw-thread.

As rotation of the pin 12 continues, the formations 20 ride along the floors 23. As a result of the sloped structure of the floors 23, as the formations 20 ride along the floors in this manner, the floors exert a force on the formations, urging them against the biasing force of the support 15.1 or resilient elements 19 (depending on which embodiment of the retaining element 15 is employed) by deforming the support or resilient elements. The pin 12 is rotated to a position where the formations 20 engage the land areas 26. The flatness or concavity of these areas 26 results in the pin 12 being held relatively stably against rotation, by the formations 20 and by the biasing force of the support 15.1 or resilient elements 19. The pin 12, when in this position, is prevented, by engagement of the formations 20 with the walls 21 of the respective slots 22, from being slid out of the aligned passages 11. Thus the pin 12, when in this position, also serves to prevent separation of the tooth 2 and adaptor 3. This position of the pin 12, in which it cannot be withdrawn, may be considered as a "locked position". When in this position, the end 28 of the pin 12 abuts, and slightly deforms, the resilient element 9 where this resilient element is provided. This also serves to add to the stability of the holding in place of the pin 12, by urging the walls 21 against the formations 20 to increase friction forces.

The closure 8 prevents the pin 12 from falling out the lower end of the aligned passages 11. It also prevents dirt and other particles from entering the lower end of the sub-passage 7.2. Such dirt and particles might otherwise enter the aligned passages 11 via that lower end of the sub-passage 7.2, and when compacted could become trapped at the interface between the pin 12 and the walls of the aligned passages 11, thereby obstructing removal of the pin.

Figure 13:
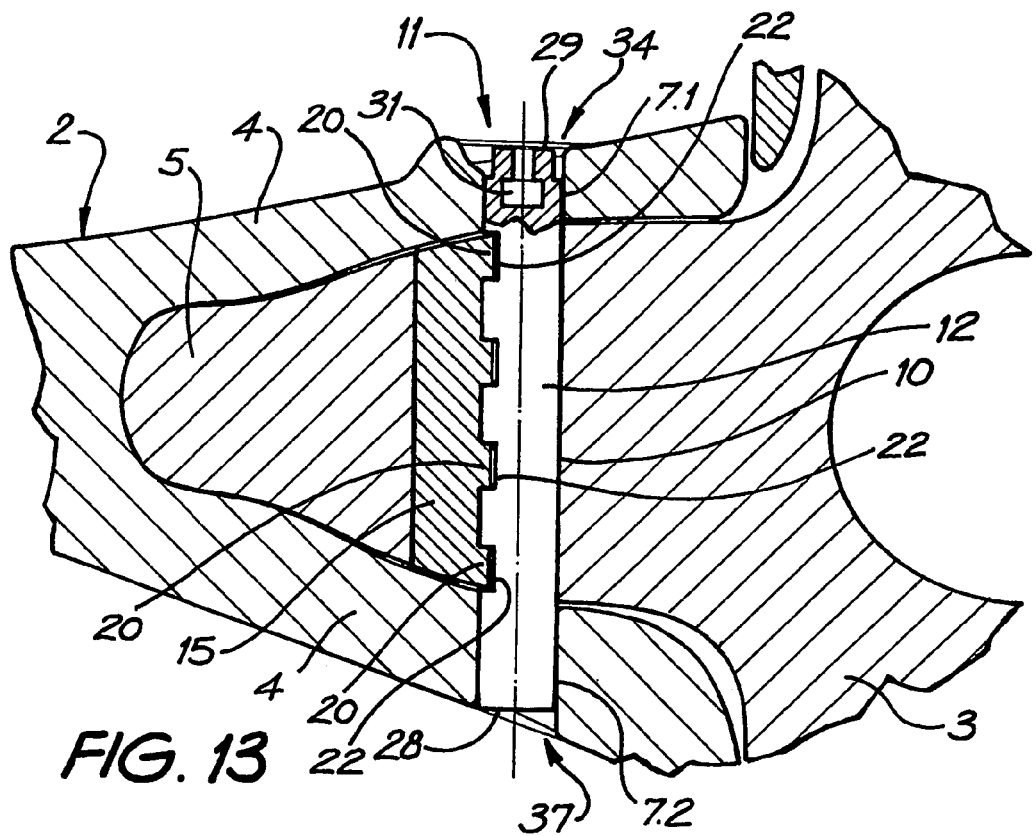

FIG. 13 illustrates the location of formations 20 within the slots 22 of the pin 12 when the pin is in the locked position.

When it is desired to separate the tooth 2 and adaptor 3 from each other, the same tool that was used to rotate the pin 12 to the locked position can be used, on the nut 30, to rotate the pin 12 to the position in which the insertion recess 27 is aligned, once again, with the formations 20. In this position, the pin 12 may be slid out of the aligned passages 11 substantially unimpeded by the formations 20. Thus, this position of the pin 12 may be regarded as a "free position". In a preferred form of this embodiment, the pin is rotated through 90 degrees between the free position and the locked position. When rotating the pin 12 from the locked position to the free position, the helical orientation of the slots 22 results in the formations 20 forcing the pin partly out of the aligned passages 11. Once the pin 12 is in the free position, a suitable tool (not shown) can be inserted through the slotted aperture 33, and engaged with an inner surface 35 of the end portion 32 of the nut 30, "bayonet" fashion, to pull the pin free from the aligned passages 11. In another embodiment (not shown), instead of having the cavity 31, and instead of having the aperture 33 being slotted, the aperture 33 is provided with an internal screw thread and is configured for a suitable tool, such as a lifting eye bolt, having a complementary screw thread, to be screwed into the aperture for removing the pin 12.

Figure 12:
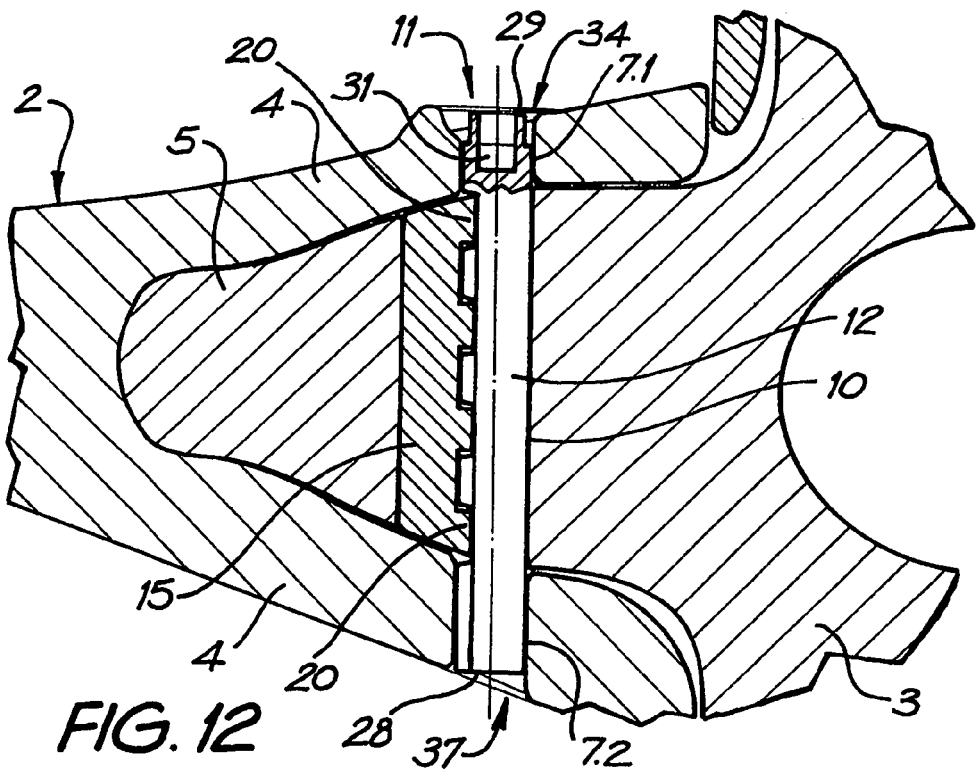
FIGS. 12 and 13 are a schematic side elevations, shown partly cut away, of detail of apparatus similar to that shown in FIG. 3, but in accordance with a different embodiment, with the locking pin shown in a free position, and a locked position, respectively.

FIG. 12 illustrates the formations 20 being outside of the slots 22 of the pin 12, when the pin is in the free position.

Referring to FIGS. 10 and 11, there is shown another embodiment of the pin 12. In this embodiment the slots 22 do not extend helically and, in addition to the insertion recess 27 which extends to the end 28 of the pin 12, there is also provided a withdrawal recess 36. The withdrawal recess 36 is spaced from the insertion recess 27, circumferentially relative to the pin 12 as shown, and extends, longitudinally relative to the pin, to the opposite end 29 of the pin. This embodiment of the pin 12 is suitable for use with an embodiment of the tooth 2 which does not have a closure 8, that is, an embodiment in which the aligned passages 11 are open not only at the end 34, but also at the opposite end 37, as shown in FIGS. 12, 13 and 14.

In this embodiment of the pin 12, each floor 23 is sloped radially outwardly, relative to the axis 13, toward the land areas 26 of the slots 22, from both sides of the land areas. As a result, once the pin 12 has been inserted and rotated to the locked position as described above, it can thereafter be rotated, in the same direction, so that the formations 20 ride along the floor 23 on the opposite side of the land area 26 to that along which they rode when the pin was first rotated to the locked position, until the withdrawal recess 36 is aligned with the formations. In this position, as the withdrawal recess 36 extends all the way to the end 29 of the pin 12, the pin may be pushed from the aligned passages 11 via the end 37 thereof (i.e. the bottom end as shown in FIGS. 12, 13 and 14) to remove it when it is desired to separate the tooth 2 and adaptor 3 from each other. It will be appreciated that the position in which the withdrawal recess 36 is aligned with the formations 20, that is, the position in which the pin 12 can be removed from the aligned passages 11 unimpeded by the formations, may also be considered as a "free position" of the pin. In a preferred form of this embodiment, the insertion recess 27 and withdrawal recess 36 are positioned such that the pin 12 is rotated through 90 degrees between the locked position and each of the respective free positions.

Figure 14:
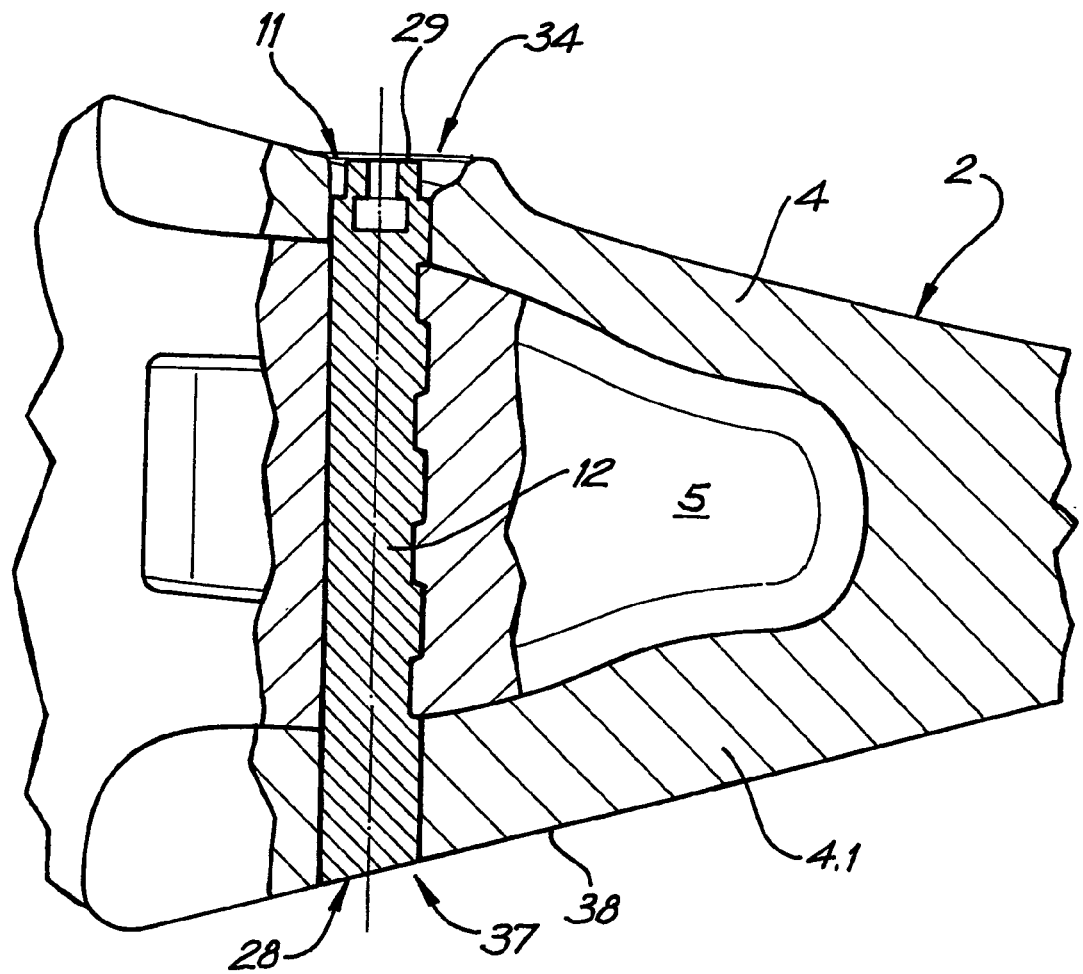
FIG. 14 is a schematic side elevation, shown partly cut away, of detail of apparatus similar to that shown in FIG. 3, but in accordance with yet a further embodiment.

In this embodiment of the pin 12, the end 28 of the pin may be substantially perpendicular to the axis 13 as shown in FIGS. 12 and 13, or it may be angled as shown in FIG. 14, so as to match the angle of the outer surface 38 of the lowermost protrusion 4 of the tooth 2 (this particular protrusion being designated 4.1 in FIG. 14). The angling of the end 28 of the pin 12 in this way is advantageous as it limits the extent to which debris and other contaminants may enter the sub-passage 7.2 which contaminants might possibly clog the interface between the pin and the sub-passage 7.2 thus restricting removal of the pin.

A polyurethane nut cap 39 (shown removed in FIGS. 2 and 3) is provided for removably covering the nut 30. The nut cap 39 has an inner aperture 40 (see FIG. 3) having a shape complementary to that of the nut 30. Accordingly, the nut cap 39 can fit snugly on the nut 30, to protect it and prevent the ingress of matter into the cavity 31 via the slotted aperture 33.

As the pin 12 can slide relatively easily into the aligned passages 11 and then be rotated to the locked position, the need to hammer the pin in place, as required in prior art pins, is avoided. This, in turn, avoids the dangers associated with such hammering, including metal fragments breaking off the pin or the hammering tool which could cause injury, and avoids muscle injury that could be caused by the hammering action. When it is desired to remove the pin 12 to separate the tooth 2 and adaptor 3 from each other, for example where the tooth has worn down and needs to be replaced, the action of rotating the pin 12 from the locked position to the free position, and then sliding the pin from the aligned passages 11, has similar advantages.

In the embodiment including the closure 8, where the slots 22 extend helically, the configuration of the slots further facilitates this pin-removal process as the pin is partly forced from the aligned passages 11 on rotation. The closure 8 also prevents the pin 12 inadvertently sliding out through the lower end of the sub-passage 7.2 when the pin is in its free position. On the other hand, in the embodiment where there is no closure 8, the pin 12 can be pushed through the lower end of the sub-passage 7.2 so that the need to withdraw it from the aligned passages via the same end through which it was inserted, is avoided.

Although the invention is described with reference to specific embodiments, it will be understood by those skilled in the art that it is not limited to these embodiments, and may be embodied in many other forms. Thus, instead of the tooth 2 and adaptor 3, a pin similar to the pin 12 may be used to interlock two other components. Such other components may, for example, be a tooth and a lip of an earth moving bucket, or another type of wear component and its mounting, or a lip or wing shroud and its mounting, or rigging components for drag lines, such as shackles or devises and their shackle- or clevis-pins, or trunnions and their links.

The invention claimed is:

1. Apparatus including:
a first component defining a first passage;
a second component connectable with the first component and defining a second passage, said passages being aligned when the components are connected to each other;
a rotatable locking pin having formations and a retaining element having engaging formations complementary to said formations and each configured for being accommodated in the aligned passages, the rotatable locking pin being rotatable relative to the components when accommodated in the aligned passages between
a locked position in which the formations of the locking pin engage at least one of the engaging formations of the retaining element so as to prevent withdrawal of the locking pin from the aligned passages and to prevent separation of the components, and
a free position in which the pin is slidably removable from the aligned passages to permit separation of the components,
wherein said formations of the pin are at least partly disposed along a circumference of the pin,
wherein the pin is configured so that said formations interlock with the engaging formations of the retaining element as the pin is rotated from the free position to the locked position to prevent separation of the first and second components;
wherein the pin has therein an insertion recess extending, longitudinally relative to the pin to accommodate the retaining element and to permit insertion of the pin into the aligned passages when the insertion recess is aligned with the retaining element;
wherein the insertion recess does not extend along an entire longitudinal length of the pin, and
wherein the pin further comprises a withdrawal recess and said withdrawal recess is displaced longitudinally on a circumference of the pin and apart from the insertion recess, which withdrawal recess permits withdrawal of the pin from the aligned passages, when the withdrawal recess is aligned with the retaining element.

2. Apparatus according to claim 1, wherein the pin when inserted into the aligned passages with the insertion recess aligned with the retaining element, the pin is in the free position and is rotatable to the locked position in a particular rotational direction, and once having being rotated to the locked position, is rotatable in the particular rotational direction to a further position in which the withdrawal recess is aligned with the retaining element.

3. Apparatus including:
a first component defining a first passage;
a second component connectable with the first component and defining a second passage, said passages being aligned when the components are connected to each other;
a rotatable locking pin having formations and a retaining element having engaging formations complementary to said formations and each configured for being accommodated in the aligned passages, the rotatable locking pin being rotatable relative to the components when accommodated in the aligned passages between
a locked position in which the formations of the locking pin engage at least one of the engaging formations of the retaining element so as to prevent withdrawal of the locking pin from the aligned passages and to prevent separation of the components, and
a free position in which the pin is slidably removable from the aligned passages to permit separation of the components,
wherein said formations of the pin are at least partly disposed along a circumference of the pin,
wherein the pin is configured so that said formations interlock with the engaging formations of the retaining element as the pin is rotated from the free position to the locked position to prevent separation of the first and second components, and
wherein one of the passages of one of the components is closed at one end such that the aligned passages are closed at one end.

4. Apparatus according to claim 3, wherein the component having a passage closed at one end includes a resilient element in that passage immediately adjacent the one closed end, wherein the pin, when accommodated in said aligned passages, is configured to abut against the resilient element.

5. Apparatus including:
a first component defining a first passage;
a second component connectable with the first component and defining a second passage, said passages being aligned when the components are connected to each other;
a rotatable locking pin having formations and a retaining element having engaging formations complementary to said formations and each configured for being accommodated in the aligned passages, the rotatable locking pin being rotatable relative to the components when accommodated in the aligned passages between
a locked position in which the formations of the locking pin engage at least one of the engaging formations of the retaining element so as to prevent withdrawal of the locking pin from the aligned passages and to prevent separation of the components, and a free position in which the pin is slidably removable from the aligned passages to permit separation of the components, wherein said formations of the pin are at least partly disposed along a circumference of the pin, and wherein the pin is configured so that said formations interlock with the engaging formations of the retaining element as the pin is rotated from the free position to the locked position to prevent separation of the first and second components, and wherein the passage of one of said components includes two coaxial spaced-apart sub-passages, and the passage of the other component is disposed between, and aligned with, said sub-passages when the components are connected to each other, to form said aligned passages.

6. Apparatus including:

a first component defining a first passage;

a second component connectable with the first component and defining a second passage, said passages being aligned when the components are connected to each other;

a rotatable locking pin having formations and a retaining element having engaging formations complementary to said formations and each configured for being accommodated in the aligned passages, the rotatable locking pin being rotatable relative to the components when accommodated in the aligned passages between a locked position in which the formations of the locking pin engage at least one of the engaging formations of the retaining element so as to prevent withdrawal of the locking pin from the aligned passages and to prevent separation of the components, and a free position in which the pin is slidably removable from the aligned passages to permit separation of the components, wherein said formations of the pin are at least partly disposed along a circumference of the pin, wherein the pin is configured so that said formations interlock with the engaging formations of the retaining element as the pin is rotated from the free position to the locked position to prevent separation of the first and second components, wherein at least part of said retaining element is resiliently movable under a force exerted by the pin when the pin is rotated from said free position to said locked position, wherein said part of the retaining element is resilient and allows said resilient movement, while urging said part against the pin, wherein said resilient element includes an elastomeric support and an engagement element, and wherein the engagement element of the retaining element abuts the elastomeric support.

7. Apparatus according to claim 6, wherein the support defines a channel in which the engagement element is received.

8. Apparatus according to claim 7, wherein the support and engagement element are bonded to each other.

9. Apparatus according to claim 7, wherein the support defines a deformation passage extending substantially parallel to said support, to facilitate resilient deformation of the support.

10. Apparatus according to claim 6, wherein the engagement element is castellated so as to define a plurality of said engaging formations, each of which engages said pin when the pin is in the locked position.

11. Apparatus according to claim 6, wherein said retaining element has a hole having a closed end and an opposite open end, said engaging formation being located within said hole, the engaging formation or engagement element being movable along said hole and abutted against said resilient element, and protruding through said open end.

12. Apparatus according to claim 11, wherein the resilient element is constituted by an elastomeric material.

13. Apparatus according to claim 11, wherein the retaining element includes a plurality of said holes and a plurality of said engaging formations.

* * * * *